United States Patent [19]

Czetwertynski

[11] Patent Number: 4,805,810
[45] Date of Patent: Feb. 21, 1989

[54] DOSATING DISPENSER FOR TOPICAL FORMULATIONS

[75] Inventor: Albert S. Czetwertynski, PointeClaire, Canada

[73] Assignee: E. R. Squibb & Sons, Inc., Princeton, N.J.

[21] Appl. No.: 491,676

[22] Filed: May 5, 1983

[51] Int. Cl.$^4$ .............................................. B67D 5/08
[52] U.S. Cl. .................... 222/319; 222/320; 222/391; 604/224
[58] Field of Search ............... 222/391, 386, 319, 320; 604/224; 74/141.5

[56] References Cited

U.S. PATENT DOCUMENTS

| | | | |
|---|---|---|---|
| 1,217,663 | 2/1917 | Taylor | 222/391 |
| 1,896,750 | 2/1933 | Maas | 222/391 |
| 2,282,727 | 5/1942 | Kasuske | 222/391 |
| 2,732,101 | 1/1956 | Söhn | 222/391 |
| 4,444,560 | 4/1984 | Jacklich | 222/391 |

FOREIGN PATENT DOCUMENTS

| | | | |
|---|---|---|---|
| 555582 | 1/1957 | Italy | 222/391 |
| 696310 | 8/1953 | United Kingdom | 222/391 |

Primary Examiner—Joseph J. Rolla
Attorney, Agent, or Firm—Lawrence S. Levinson; Burton Rodney

[57] ABSTRACT

A dispenser is provided which is especially useful in dispensing measured doses of topical preparations such as creams or ointments. The dispenser includes a container for holding a supply of topical preparation. A plunger assembly is operatively mounted to the container and includes a plunger piston and a plunger shaft which carries a series of longitudinally disposed teeth. The piston and plunger shaft include communicating openings. A cap seals off the mouth of the container. A portion of the plunger shaft extends through the cap externally of the container. A lever assembly is pivotally mounted on the cap and is operatively associated with the plunger shaft and piston, the lever assembly including teeth engaging means adapted to interact with the teeth of the plunger shaft. Upon depressing the pivotally mounted lever assembly, the teeth engaging means thereof engages the teeth of the plunger shaft thereby forcing the plunger shaft and connecting plunger piston downwardly and forcing topical preparation, stored in the container, upwardly out through the plunger piston and shaft.

6 Claims, 3 Drawing Sheets

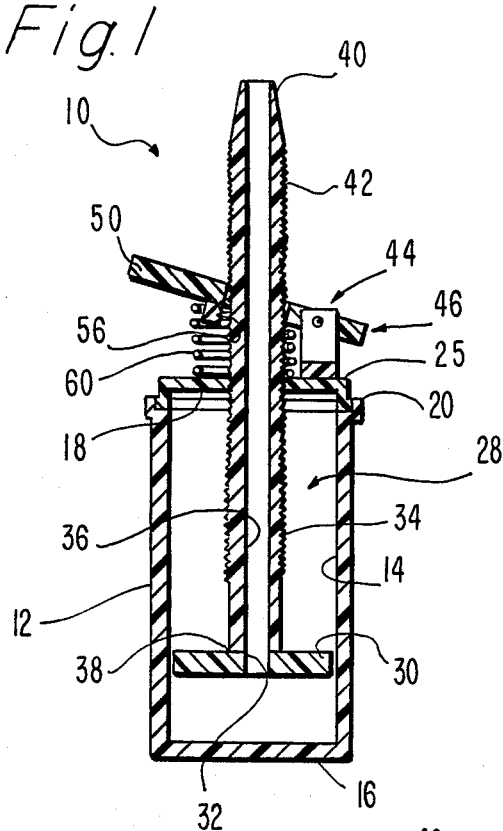
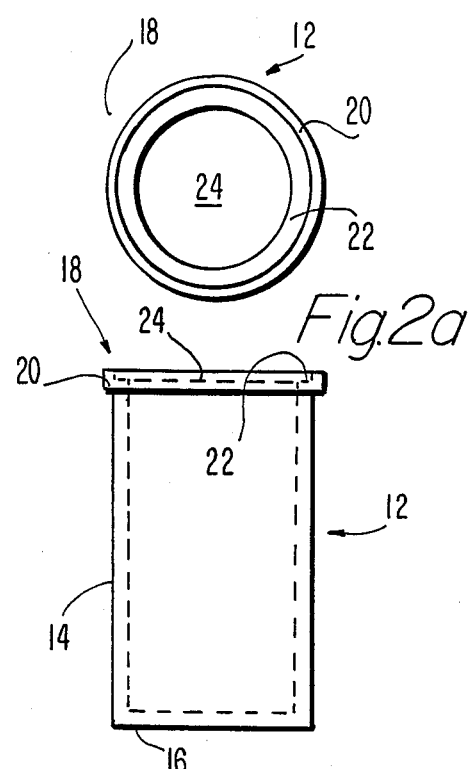
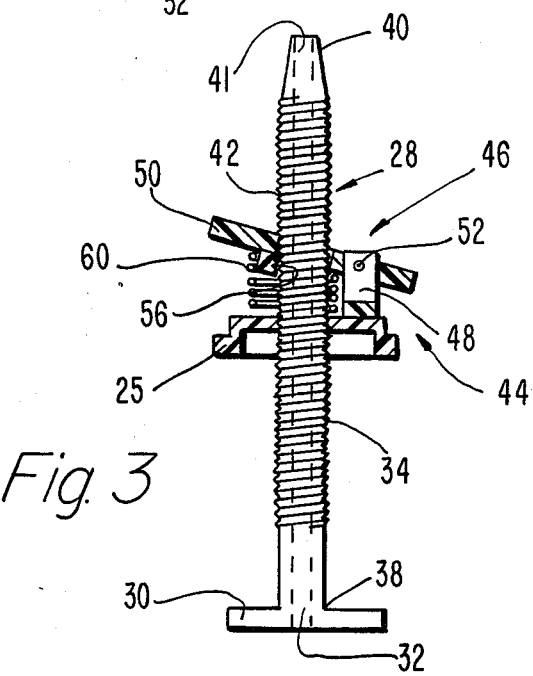
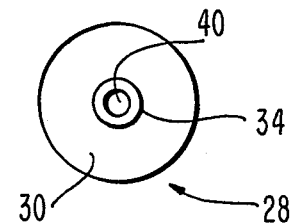

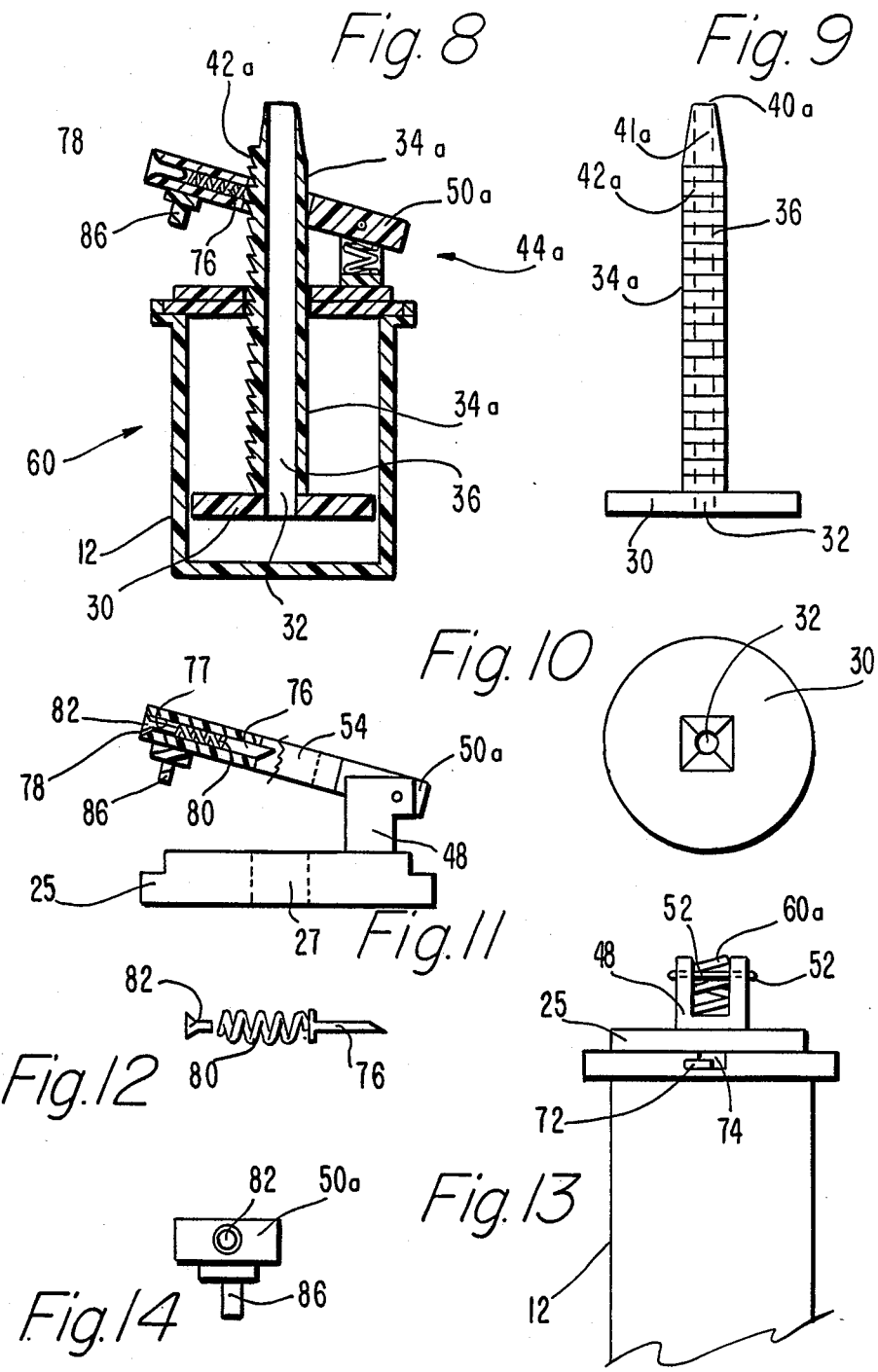

DOSATING DISPENSER FOR TOPICAL FORMULATIONS

FIELD OF THE INVENTION

The present invention relates to dosating dispensers for topical preparations such as creams or ointments.

BACKGROUND OF THE INVENTION

Upon completing his diagnosis, a physician will prescribe a suitable drug therapy including the drug to be dispensed, its potency, its dosage along with the regimen that must be followed. While most pharmaceutical forms are well adapted to these needs, creams and ointments packaged in their most prevalent format (tubes and jars) do not permit a quantitative application of the medication. The amount of medication being dispensed cannot be controlled. This is a very troublesome situation, indeed, since many topical drugs are quite potent and use of excessive amounts thereof could lead to undesirable side-effects. Accordingly, a package which would permit a quantitative measurement of a topical medication would be a most welcomed addition to the pharmaceutical packaging industry.

BRIEF DESCRIPTION OF THE INVENTION

In accordance with the present invention, a dosating dispenser is provided which may deliver a preset fixed measured dosage of medication, comparable to other dosage forms. In one embodiment of the invention, the incremental dosage delivered may be varied, within a specified range, as desired, to deliver, at any given moment, a specific preset fixed dosage. The dosating dispenser of the invention is especially adapted for dispensing preset fixed amounts of creams and ointments and includes, in combination.

a container for holding a supply of cream or ointment, including side walls, bottom and mouth opening;

a plunger assembly adapted to be operatively mounted in said container, the plunger assembly including a plunger piston adapted to slidably move and snugly fit within the interior walls of the container, the plunger piston including an orifice extending therethrough;

and a plunger shaft including a series of teeth extending along at least a portion of the length thereof and further including a longitudinal bore extending from a first end to a second end, the second end terminating in a dispensing orifice which extends beyond the mouth of the container, the first end of the plunger shaft being connected to the plunger piston with the longitudinal bore thereof in communication with the orifice of the plunger piston;

cap means adapted to fit over and seal off the mouth of the container and including an opening through which the plunger shaft passes as it extends beyond the mouth of the container; and a lever assembly mounted on the cap means and operatively associated with the plunger shaft, the lever assembly including lever means and lever mounting means for pivotally mounting the lever means on the cap means, the lever means including an opening through which the plunger shaft extends and teeth engaging means for engaging the lever means with the teeth of the plunger shaft, whereby upon depressing the lever means, the teeth engaging means of the lever means engages the teeth of the plunger shaft thereby forcing the plunger shaft and plunger piston connected thereto downwardly into the container and forcing a cream or ointment held in said container upwardly through the orifice of the plunger piston, through the longitudinal bore of the plunger shaft and out the dispensing orifice of the plunger shaft.

In one embodiment of the present invention, the dosating dispenser includes means for varying or presetting the fixed desired dosage to be delivered. Thus, in this embodiment the actual fixed dosage may be preset to deliver cream or ointment in a dose within a range of from about one-quarter to one-half milliliter. cl BRIEF DESCRIPTION OF THE FIGURES FIG. 1 is a side elevational view, partially in section, of a preferred embodiment of the dosating dispenser in accordance with the present invention including a plunger assembly, lever assembly and associated cap means employed in conjunction with a container;

FIG. 2 is a side elevational view of the container shown in FIG. 1;

FIG. 2A is a plan view of the container shown in FIGS. 1 and 2;

FIG. 3 is a side elevational view of the plunger assembly, lever assembly and associated cap means shown in FIG. 1;

FIG. 3A is a plan view of the plunger assembly shown in FIG. 3;

FIG. 8 is a side elevational view, partially in section, of another preferred embodiment of the dosating dispenser in accordance with the present invention including a plunger assembly including a series of upwardly pitched ratchet teeth, a lever assembly and associated cap means, and means for adjusting the fixed dosage to be delivered, employed in conjunction with a container;

FIG. 9 is a front view of the plunger assembly shown in FIG. 8;

FIG. 10 is a plan view of the plunger assembly shown in FIG. 9;

FIG. 11 is a side view of the lever assembly including teeth engaging means and associated cap means shown in FIG. 8;

FIG. 12 is an exploded view of teeth engaging means employed in the lever assembly shown in FIG. 11;

FIG. 13 is an end view partially in section of the lever assembly, and cap means which includes lock means for connecting and locking the cap means to the mouth of the container; and FIG. 14 is an end view of a portion of the lever assembly shown in FIG. 11.

DETAILED DESCRIPTION OF INVENTION AND FIGURES

Figure 7:
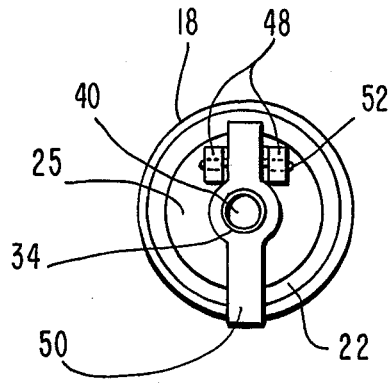
FIG. 7 is a plan view of the dispenser as shown in the preceding Figures.

Referring to the accompanying Figures wherein like parts are represented by like numerals in the several views, FIGS. 1 to 7 illustrate one of the preferred embodiments of the dosating dispenser of the invention indicated generally by the numeral 10. Dispenser 10, as shown, includes container 12 for storing a topical preparation such as a cream or ointment. As seen in FIGS. 2A and 7, container 12 will normally be of circular cross-section (although other shapes may be employed as well) and includes side walls 14, bottom 16, and mouth 18 which includes outer lip 20 having a recessed peripheral area 22 which extends to the mouth opening 24. Cap 25, which includes internal bore 27, is adapted to seat over recessed peripheral area 22 to seal off the mouth opening 24.

As best seen in FIGS. 1, 3 and 3A, the dispenser 10 also includes a plunger assembly 28 which is formed of plunger piston 30 having internal bore 32, and plunger shaft 34 having longitudinal bore 36 and includes a series of teeth such as external threads 42 running preferably from end 38 to dispensing end 40. The plunger shaft 34 is connected at end 38 to plunger piston 30 in a manner such that bores 32 and 36 are in alignment with each other and define a path of travel for cream or ointment ultimately to be dispersed through end 40.

As seen in FIG. 3A, the plunger piston 30 will preferably be of circular design (or whatever the cross-sectional shape of the container 12) and is adapted to snugly but slidably and movably fit within the interior walls 14 of container 12 but will not allow for passage of container material between the piston and container walls.

As seen in FIGS. 1 and 2, when the plunger assembly is seated in place in container 12 with the plunger piston fitted snugly within the container walls, the plunger shaft 34 extends through bore 27 of cap 25 and beyond the mouth opening 24 of the container.

Figure 4:
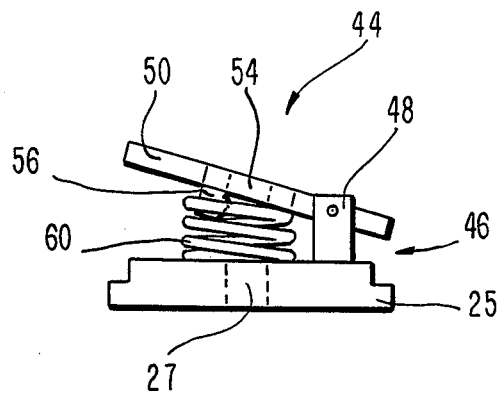
FIG. 4 is a side elevational view of the lever assembly and associated cap means shown in FIG. 1, including lever means and lever mounting means.
Figures 5, 6:
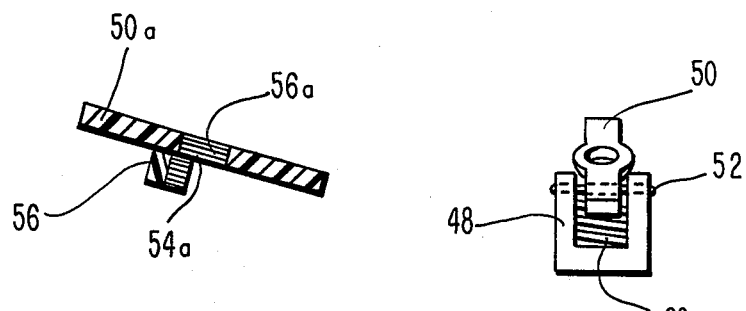
FIG. 5 is a cross-sectional view of an alternative embodiment of lever means which may be employed in the embodiment shown in FIGS. 1 to 4.
FIG. 6 is an end view of an alternative embodiment of lever mounting means which may be employed in the embodiments shown in FIGS. 1 to 5.

A lever assembly is generally identified by the numeral 44 and includes lever mounting means 46 which as seen in FIGS. 4 and 6 may be comprised of a pair of spaced upright posts 48 mounted on cap 25 and lever 50 which is disposed within and pivotally mounted to posts 48 via pivot pin 52. The lever 50 includes a bore 54 through which plunger shaft 34 extends as seen in FIGS. 1 and 2, and teeth engaging means 56 extending downwardly therefrom as shown.

In the embodiment illustrated in FIGS. 1 to 3, the teeth engaging means 56 is comprised of a member connected to and extending downwardly from lever 50 and which includes teeth or threads adapted to engage the threads 42 of plunger shaft 34 as lever 50 is depressed. Spring 60 is disposed about the plunger shaft 34 and teeth engaging means 56 between lever 50 and cap 25 and functions to maintain the teeth engaging means 56 in contact with threads 42 of plunger shaft 34 while ensuring that lever 50 when released will return to its intended initial rest position as shown in FIGS. 1 and 3.

In an alternative embodiment of the invention, as shown in FIG. 5, the teeth engaging means may comprise a series of threads 56a (or other thread or teeth gripping means such as one or more projections) disposed in bore 54a of lever 50a. The threads 56a will grip corresponding threads on plunger shaft 34 as lever 50a is depressed.

Where the teeth engaging means of FIG. 5 are employed, the spring 60 may still be disposed about plunger shaft 34; alternatively, as seen in FIG. 6, spring 60a may be disposed and retained between lever mounting posts 48 and between lever 50 and cap 25.

In operation, the dosating dispenser 10 is initially filled with cream or ointment. This is accomplished by simply grasping a portion of the lever assembly 44, plunger shaft 34 and/or cap 25 and lifting thereby removing the plunger shaft and piston out of container 12. Cream or ointment is then added and the plunger shaft and piston inserted into the container and cap 25 seated over container mouth opening 24 to seal same. It would be well advised to place a stopper over the dispersing end 40 of piston shaft 34 prior to seating cap 25 over container mouth opening 24 to prevent accidental discharge of cream or ointment.

When it is desired to dispense container contents, the lever 50 is simply depressed thereby forcing spring 60 to compress in turn causing the teeth engaging means 56 to engage threads 42 of plunger shaft 34. As the lever 50 is depressed the teeth engaging means 56 forces the plunger shaft 34 and plunger piston 30 downwardly into the container. Continued downward movement of plunger shaft 34 causes plunger piston 30 to press against and force cream or ointment downwardly and finally up through piston bore 32 and longitudinal bore 36 and out the dispensing end 40.

When lever 50 is released, spring 60 forcing lever 50 to return to its starting position as shown in FIGS. 1 and 2.

The dispenser as described dispenses a known measured volume of medication based on the depth to which the plunger shaft and piston penetrate into the container as well as the size of the bores 32, 36 and orifice 40 all of which would be directly proportional to the volume of medication dispensed. The actual depth of penetration of the plunger shaft and piston will be determined by the number of teeth or threads carried by the teeth engaging means 56 (whether they are carried by appendage 56 of FIG. 1 or are disposed in bore 56a of lever 50a as shown in FIG. 5) and the distance that the lever 50 may be moved downwardly before it is restricted by spring 60 or obstructed by the cap 25. Where the spring is positioned as in FIG. 6, then the distance between the cap 25 and lever 50 will be used for calibration purposes. Thus, if the teeth engaging means 56 carries four (4) threads, for example, each depression of lever 50 will cause the plunger shaft and piston to move downwardly a distance equal to four (4) threads and will thereby cause a fixed volume of cream or ointment to be dispensed. The actual amount of cream or ointment delivered will be in the range of from about one-quarter to about one-half milliliter depending upon the calibration with proper number of threads of the plunger shaft engaged by the teeth engaging means 56 and the characteristics of spring 60. Once calibration is established in equal increments, a physician could then presribe any multiple of the basic increment, for example ¼ ml, for the treatment of an ailment. If desired, the dispensing pharmacist may adjust the teeth engaging means so that the desired quantity of medication will be dispensed or preset the delivery system to deliver an integer of the basic increment, for example 1×¼, 2×¼, 3×¼, etc.

The orifice and the dispensing end 40 of plunger shaft 34 may be designed so that the medication is dispensed in a gentle stream the shape of which would be dictated by the geometry of the orifice and the canal 41 leading to the orifice. If a particularly wide orifice is used, a large blotch of material will be dispensed which then must be spread onto the affected area by the patient's forefinger. However, if the bore size is too restricted, there may be an undesirable increase in flow restrictions which would require more applied pressure to dispense material. Acoordingly, to promote desired spreadability and activation pressure, it is preferred that the orifice and the portion of the plunger shaft leading thereto have an elliptical cross-section, for example, minor axis ¾ mm, major axis 5-6 mm. However, it will be understood that the dispensing orifice and adjacent canel portion 41 of the plunger shaft 34 may also be of circular, rectangular, square or of other shape.

The actual container 12 may be fashioned to hold a standard desired volume of material, for example, 6 to 20 ml, so that it will be capable of delivering the desired number of incremental doses, for example, 50 doses of ¼ ml each.

The container material as well as the other components of the dosating dispenser will preferably be comprised of plastic, such as high density polyethylene or other material adaptable to an injection blow molding process.

Referring now to FIGS. 8 to 14, there is shown another preferred embodiment of the dosating dispenser of the invention indicated generally by the numeral 60. The dispenser 60 includes a container 12 and cap 25 which is employed to seal off the mouth opening of container 12 in a manner similar to that described with respect to FIGS. 1 to 7. As shown in FIG. 13, the cap 25 may be fashioned with a locking mechanism, such as a protruding knob 72 which fits and is locked into slot 74 on cap 25.

Dispenser 60 includes a plunger assembly similar to that shown in FIG. 1 except that the plunger shaft identified by numeral 34a includes a series of teeth formed upwardly pitched ratchet teeth or notched tracks 42a best shown in FIGS. 8 and 9.

The plunger shaft 34a and bore 27 in cap 25 will preferably have a square cross-section in order to accommodate the ratchet teeth 42a which, in such case, need only be located on one side of the plunger shaft.

The lever assembly 44a is similar to that employed in FIGS. 1 to 7 with the following exceptions. The teeth engaging means 56 will comprise a spring loaded ratchet pin 76 which is adapted to engage ratchet teeth 42a. The lever 50a is fashioned with an internal canal 77 extending from end 78 to internal bore 54. Pin 76 is fitted into the internal canal 77 followed by spring 80 and plug 82 which retains spring 80 into contact with pin 76, as shown in FIGS. 11 and 12.

It is by means of spring loaded pin 76 that the lever 50a contacts ratchet teeth 42a of plunger shaft 34a and allows plunger shaft 34a and piston 30 to be forced downwardly into container 12.

The lever 50a may optionally be fashioned with a lever limiting pin 86 which may screw in or otherwise be attached to the undersurface of lever 50a, as shown. Upon depressing lever 50a, the limiting pin 86 will eventually strike and be obstructed by cap 25 thereby limiting downward movement of lever 50a and plunger shaft 34a and thus defining a limit on amount of material to be dispensed. The size or length of the limiting pin 86 may vary and, in fact, may be changed from time to time, as desired, depending upon the incremental amount of material to be dispensed.

As seen in FIGS. 8 and 13, spring 60a is located between posts 80 and between lever 50a and cap 25 to ensure continuous return of the lever to its original position once it has been released. However, as with the dispenser of FIG. 1, spring 60 may be disposed about plunger shaft 34a between the lever 50a and cap 25.

As in the case of the dispenser described with respect to FIGS. 1 to 7, the amount or volume of material to be dispersed will depend upon the distance or number of ratchet teeth that plunger shaft 34a is moved downwardly, as well as on the size of the bores 32 and 36 and the size of the canal 41a and orifice 40a. The actual number of notches or ratches that the plunger shaft 34a will move downwardly is, of course, dependent upon the distance that lever 50a may be forced downwardly before movement of the lever 50a is limited by cap 25. This distance may be calibrated with the number of ratchet teeth that plunger shaft 34a is moved downwardly and the desired incremental volume to be delivered. Thus, in one mode, the lever 50a may be employed without limiting pin 86 so that lever 50a may be depressed until it strikes cap 25; the volume of material delivered in this case may be, for example, ½ ml. However, if a limiting pin 86 is inserted in lever 50a, the lever 50a may move only one-half the distance (without pin 86) before it is obstructed by cap 25 so that only ¼ ml increments are dispensed. As will be apparent, the length of the limiting pin 86 may be shortened to allow for incremental delivery of some amount between ¼ and ½ ml. It will also be apparent that by moving the position of the limiting pin closer to the bore 54 of lever 50a, the distance required for the lever 50a to be moved before it strikes the cap 25 will also be shortened.

The dispenser embodiment shown in FIG. 8 to 14 will operate in a manner similar to that shown in FIGS. 1 to 7. Upon depressing lever 50a, teeth engaging pin 76 will engage ratchet teeth 42a of plunger shaft 34a causing the plunger shaft and piston to be forced into container 12 which in turn causes container contents to be forced through bores 32 and 36 and out of orifice 40a.

It will be appreciated that the engaging thread mechanism of FIGS. 1 to 7 and the ratchet mechanism of FIGS. 8 to 14 allow the plunger piston 30 to be moved in only one direction, that is downwardly, so that the contents of the container may be protected at all times from the atmosphere. In addition, the plunger piston 30 will fit snugly within the container 12 leaving little, if any, room for cream or ointment to pass between the piston and the internal walls of the container.

What is claimed is:

1. A dispenser for delivering measured dosages of topical preparations comprising, in combination, a container for holding a supply of topical preparation, said container including a closed lower end and an open mouth at an upper end;

a plunger assembly adapted to be operatively mounted in said container, said plunger assembly comprising a plunger piston, including a central bore, adapted to slidably move and snugly fit within the interior walls of said container, and a plunger shaft including a series of teeth extending along at least a portion of the length thereof and further including a longitudinal bore extending from a first end to a second end of said plunger shaft, said second end terminating in a dispensing orifice which extends beyond the mouth of the container, said first end of said plunger shaft being connected to said plunger piston with said longitudinal bore thereof in communication with said bore of said plunger piston;

cap means adapted to fit over and seal off the mouth of said container and including an opening through which said plunger shaft passes as it extends upon the mouth of said container;

a lever assembly mounted on top of and extending above said cap means and operatively associated with said plunger shaft, said lever assembly including lever means and lever mounting means for pivotally mounting said lever means to said cap means, said lever means including an opening through which said plunger shaft extends, and teeth engaging means for engaging said lever with said teeth of said plunger shaft, said teeth engaging means comprising an appendage which is connected to but extends downwardly from said lever means and which appendage includes means for engaging teeth of said plunger shaft, and spring means encircling said plunger shaft and disposed between said cap means and said lever means at least a portion of said spring means being in contact with said appendage of said teeth engaging means, said spring means maintaining the appendage in contact with said teeth of said plunger shaft when said lever means is depressed and limiting downward movement of said lever means and upon release of said lever means, returning said lever means to its rest position, whereby upon depressing said lever means, said appendage comprising said teeth engaging means of said lever means engages said teeth of said plunger shaft thereby forcing said plunger shaft and plunger piston connected thereto downwardly into said container and forcing a topical preparation held in said container upwardly through said bore of said plunger piston, through said longitudinal bore of said plunger shaft and out the second end of said plunger shaft.

2. The dosating dispenser as defined in claim 1 wherein said series of teeth extending along said plunger shaft comprises a series of threads.

3. The dosating dispenser as defined in claim 2 wherein said teeth engaging means of said lever means comprises a downwardly extending appendage which includes thread engaging means for engaging said threads of said plunger shaft.

4. The dosating dispenser as defined in claim 3 wherein said thread engaging means comprises a series of threads adapted to engage said threads of said plunger shaft.

5. The dispenser as defined in claim 1 wherein said series of teeth of said plunger shaft comprise upwardly pitched notches of ratchet teeth.

6. The dispenser as defined in claim 1 wherein said dispensing orifice of said plunger shaft comprises an elliptical opening through which material to be dispensed is passed.

* * * * *